United States Patent [19]

Föhl

[11] Patent Number: 5,104,145
[45] Date of Patent: Apr. 14, 1992

[54] FIRING MECHANISM FOR A PYROTECHNICAL GAS GENERATOR

[75] Inventor: Artur Föhl, Schorndorf, Fed. Rep. of Germany

[73] Assignee: TRW Rena GmbH, Alfdorf, Fed. Rep. of Germany

[21] Appl. No.: 590,369

[22] Filed: Sep. 28, 1990

[30] Foreign Application Priority Data

Oct. 9, 1989 [DE] Fed. Rep. of Germany ....... 3933720

[51] Int. Cl.⁵ ...................... B60R 22/46; B60R 21/26
[52] U.S. Cl. .................................. 280;734; 180/282; 340/429
[58] Field of Search ............... 280/806, 734, 735, 741; 180/282; 340/429

[56] References Cited

U.S. PATENT DOCUMENTS

| 3,601,081 | 8/1971 | Smith et al. | 280/734 |
| 4,161,228 | 7/1979 | Svensson et al. | 280/734 |
| 4,889,068 | 12/1989 | Tabata et al. | 280/806 |
| 4,927,172 | 5/1990 | Motozawa | 280/734 |
| 4,955,638 | 9/1990 | Kinoshita et al. | 280/806 |

FOREIGN PATENT DOCUMENTS 2755649 6/1978 Fed. Rep. of Germany .
3229304 2/1984 Fed. Rep. of Germany .
725361 3/1955 United Kingdom .

Primary Examiner—Kenneth R. Rice
Attorney, Agent, or Firm—Tarolli, Sundheim & Covell

[57] ABSTRACT

The firing mechanism for a pyrotechnical gas generator in the tightening means of a safety belt restraining system includes a pivotally mounted vehicle-sensitive inertia mass, a spring-loaded pivotally mounted strike piece, a firing pin which is arranged with its free end lying opposite the impact fuse of the gas generator and with its other end lying opposite the strike piece, and a roller blocking mechanism which in the readiness state holds the strike piece at a distance from the opposite end of the firing pin and on vehicle-sensitive pivoting of the inertia mass after over-coming an inhibition threshold releases the strike piece which then under the action of the spring biasing is driven to the oppositely disposed end of the firing pin, strikes the latter and via the firing pin effects firing of the gas generator.

12 Claims, 2 Drawing Sheets

FIRING MECHANISM FOR A PYROTECHNICAL GAS GENERATOR

The invention relates to a firing or ignition mechanism for a pyrotechnical gas generator in the tightening means of a restraining system.

For a pyrotechnical gas generator an igniter is required. Conventional tightening means pyrotechnical tightening drive are equipped with an electrical fuse or igniter which is activated via complicated electronics evaluating the vehicle retardation. For each pyrotechnical gas generator an electrical drive line is required, thereby making difficult the use on parts, in particular a vehicle seat, not rigidly secured to the vehicle bodywork.

The invention is based on the problem of providing a simple mechanical firing mechanism which responds directly in vehicle-sensitive manner and does not require complicated electronics or an electrical connecting line so that each tightening means, since it can be provided with its own mechanical firing mechanism, forms an autonomous unit.

A preferred embodiment of the mechanical firing mechanism includes a pivotally mounted vehicle-sensitive inertia mass, a spring-loaded pivotally mounted strike piece, a firing pin which is arranged with its free end lying opposite the impact fuse of the gas generator and with its other end lying opposite the strike piece, and a trigger mechanism which in the readiness state holds the strike piece at a distance from the opposite end of the firing pin and on vehicle-sensitive pivoting of the inertia mass after overcoming an inhibition threshold releases the strike piece which then under the action of the spring biasing is driven to the oppositely disposed end of the firing pin, strikes the latter and via the firing pin effects firing of the gas generator. The trigger mechanism is preferably constructed as roller blocking mechanism. Such a roller blocking mechanism includes a retaining roller mounted at the end of the strike piece remote from the firing pin, a release roller mounted on the inertia mass, a support roller mounted fixed with respect to the housing and a loose blocking roller held in the readiness state between retaining roller, release roller and support roller. In the readiness state the blocking roller assumes between the retaining roller and the support roller an over-deadcenter position in which it is held by the release roller. The release roller in turn is disposed in an over-deadcenter position in which it is supported by a housing-fixed abutment. On vehicle-sensitive pivoting of the inertia mass the release roller frees the blocking roller which is then thrown out between the support roller and retaining roller, the path of the retaining roller thereby being freed and the strike piece driven under the action of the spring biasing towards the firing pin.

Further features and advantages of the invention will be apparent from the following description of several embodiments and from the drawings to which reference is made and in which.

Figure 1:
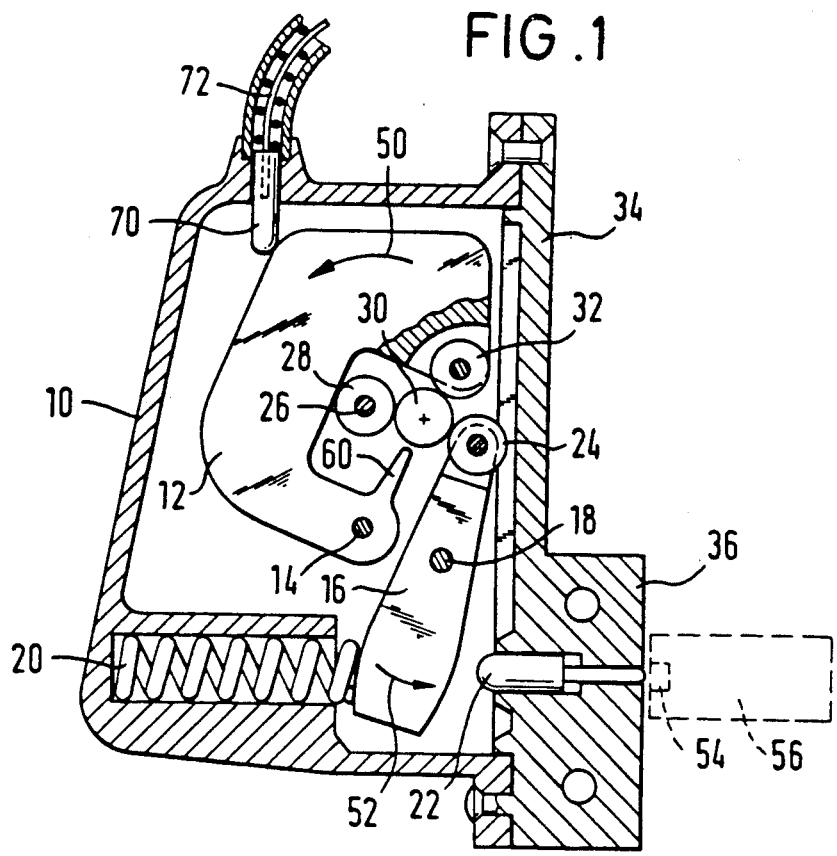
FIG. 1 shows a schematic section of the firing mechanism in the readiness state.

In the interior of the flat housing 10 an inertia mass 12 in the form of a generally U-shaped stirrup member is disposed which is pivotally mounted on a housing-fixed pin 14 at the free end of the one leg. The inertial mass 12 is pivotably movable from a first position (FIG. 1). A strike piece 16 in the form of a two-armed lever is pivotally mounted on a housing-fixed pin 18. The one arm of the strike piece 16 is urged by a pressure spring 20 in the direction of the free end of the firing pin 22 lying opposite a distance away. At the free end of the other arm of the strike piece 16 a retaining roller 24 is rotatably mounted. Furthermore, a support roller 28 is rotatably mounted on a housing-fixed pin 26. Between the support roller 28 and the retaining roller 24 a loose blocking roller 30 is disposed. The blocking roller 30 blocks the pivoting movement of the strike piece 16 when the blocking roller is in a position shown in FIG. 1. Finally, a release roller 32 is rotatably mounted at the free end of the other leg of the inertia mass 12. The housing 10 is closed by a narrow bottom plate 34 which has an integrally formed mounting lug 36 through which the firing pin 22 extends.

Figure 4:
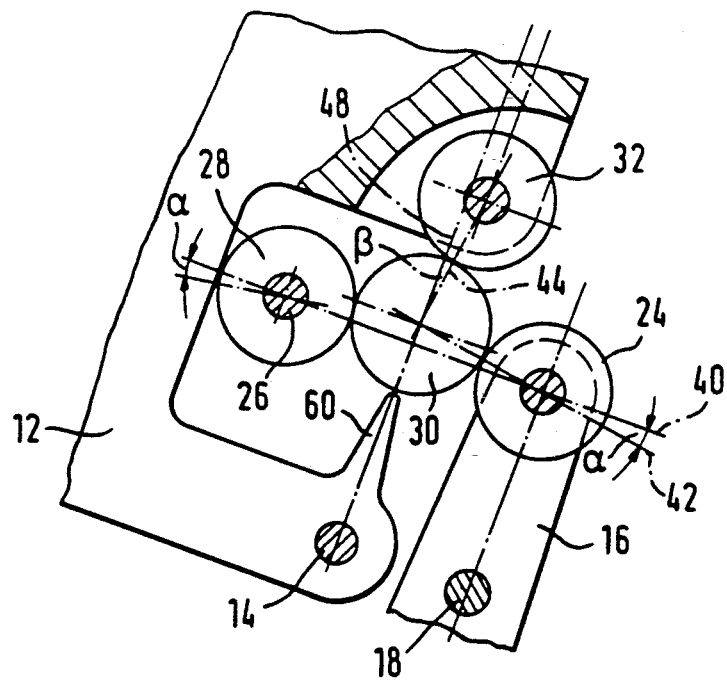

Reference will now be made to FIG. 4. The loose blocking roller 30 is disposed between the rollers 24, 28 and 32 arranged at the corners of a triangle and bears with its outer periphery in each case on the outer periphery of said rollers. The retaining roller 24 is urged by the action of the pressure spring 20 against the outer periphery of the blocking roller 30 which in turn presses against the outer periphery of the release roller 32 because it is supported at the outer periphery of the support roller 28. The blocking roller 30 is disposed between the support roller 28 and the retaining roller 24 in an over-deadcenter position which is characterized in that the angle $\alpha$ between a straight line 40 through the center points of the rollers 24 and 28 and the straight line 42 through the center points of the rollers 24 and 30 has a magnitude of a few degrees. The roller 30 therefore tends to move towards the release roller 32. Said release roller 32 is in turn disposed in an over-deadcenter position which is characterized by an angle $\beta$ which is formed between a straight line 44 through the center points of the rollers 30 and 32 and a straight line 48 which extends perpendicularly to the straight line 40 connecting the center points of the rollers 24, 28. The release roller 32 cannot follow its tendency to move in the sense of increasing the angle $\beta$ because the inertia mass 12 bears with the inner face of its web connecting the two legs on the outer periphery of the support roller 28. It would be equally possible, however, for the inertia mass 12 to bear on another stop by which the release roller 32 is kept in a metastable position.

Figure 2:
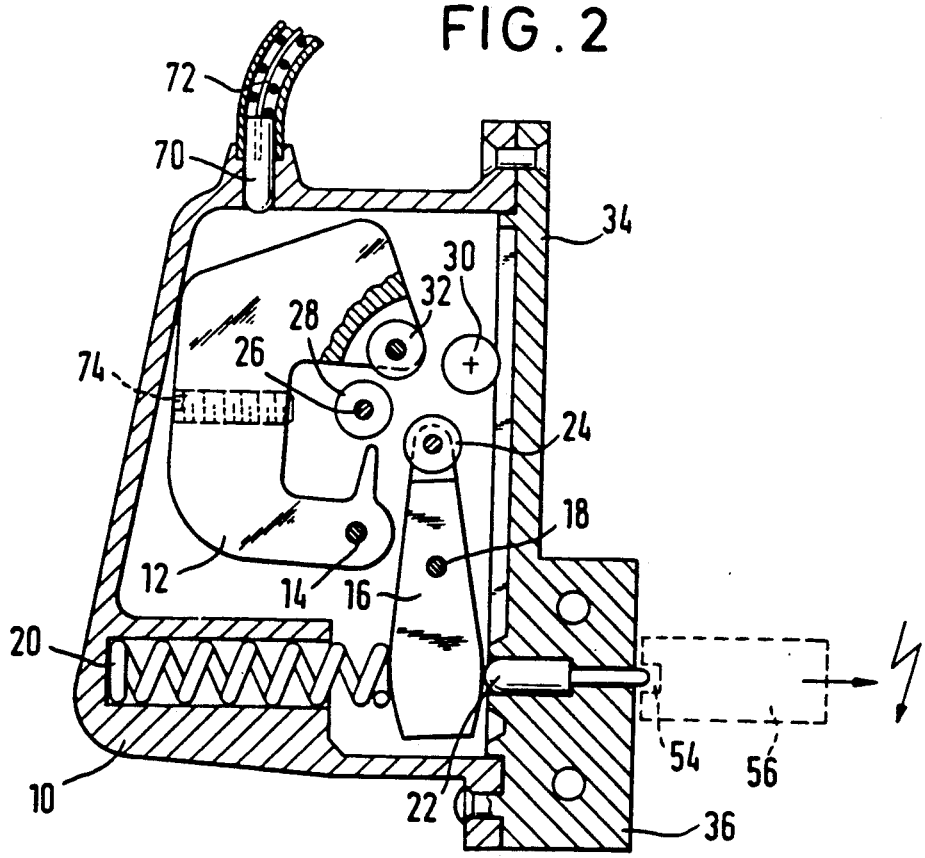
FIG. 2 shows the firing mechanism of FIG. 1 in the activated state.
Figure 3:
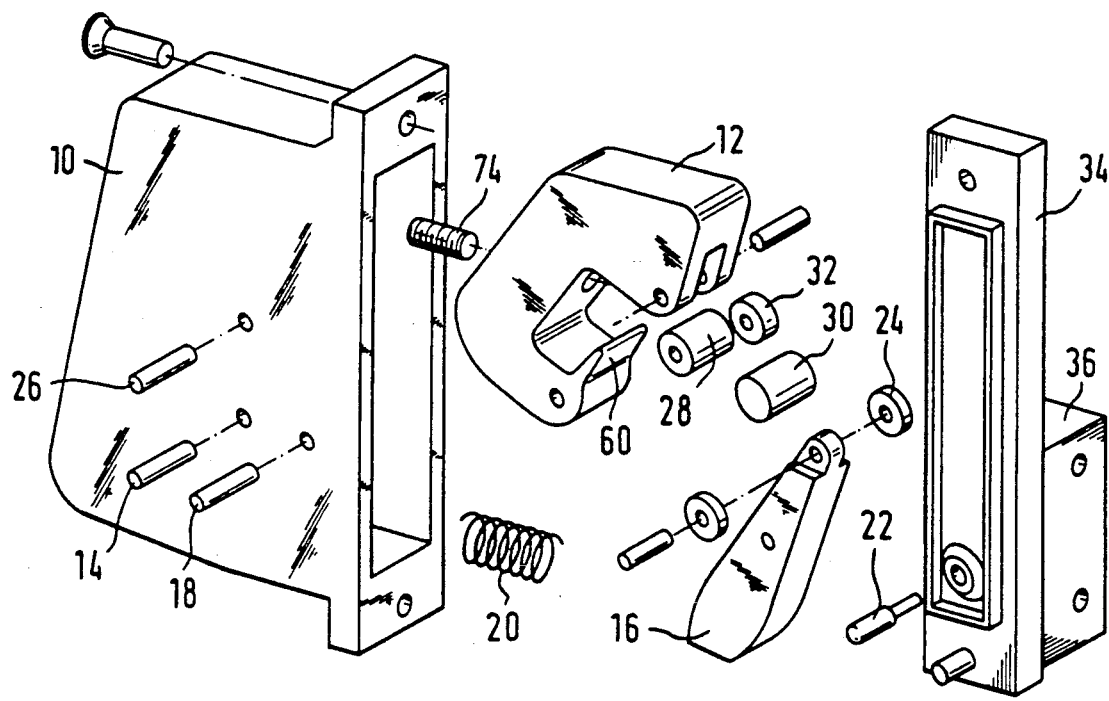
FIG. 3 is an exploded perspective view of the firing mechanism shown in FIGS. 1 and 2 and FIG. 4 is a schematic partial view of a roller blocking mechanism of the firing mechanism.

The inertia mass 12 forms a vehicle-sensitive release element. Under the action of a vehicle retardation due to its mass inertia it is pivoted in the direction of the arrow 50 (FIG. 1) about the pin 14 as soon as a predetermined inhibition threshold is overcome which is defined by the magnitude of the angles $\alpha$, $\beta$, the force of the spring 20 and the leverage of the strike piece 16 and can be exactly set. As soon as the inhibition threshold has been overcome, i.e. the release roller 32 has moved firstly in the sense of a reduction of the angle $\beta$ (FIG. 4) and then therebeyond, the pressure spring 20 assists the further pivoting of the inertia mass 12 in the direction of the arrow 50 (FIG. 1) so that the pivoting of the inertia mass 12 takes place with high angular acceleration. Within an extremely short period of time the release roller 32 releases the loose blocking roller 30 which is thrown out between the rollers 24, 28 and frees the path of the retaining roller 24 so that now the strike piece 16 under the action of the pressure spring 20 pivots in the direction of the arrow 52 (FIG. 1) and is driven against the adjacent free end of the firing pin 22. The firing pin 22 penetrates with its opposite free end into an impact fuse 54 of a gas generator 56 to activate the latter. FIG. 2 shows this state.

To facilitate the assembly of the blocking roller 30, at the free end of the pivotally mounted leg of the inertia mass 12 a beak-like projection 60 is integrally formed which in the readiness position shown in FIG. 4 is directed towards the blocking roller 30 and ends a short distance from the latter. The gas generator 56 is part of a safety belt tightening means, not shown, to which the firing mechanism can be attached directly by means of the mounting lug 36.

In the embodiment shown in FIGS. 1 and 2 the inertia mass 12 is secured in its readiness position as long as the associated belt system is not being used. For this purpose a pin 70 engages the inertia mass 12, said pin being mounted displaceably in a housing bore of the housing 10 and projecting into the path of movement of the inertia mass 12 as long as no insertion tongue has been inserted into the belt lock of the safety belt system. The insertion movement of the insertion tongue into the belt lock is transmitted via a sheathed cable 72 to the pin 70 which is then withdrawn from the path of the inertia mass 12 and releases the latter. Since numerous constructional forms of a securing are possible said securing is described here only symbolically.

Although the response thereof is vehicle-sensitive the firing mechanism described is not restricted to a specific installation orientation. An installation orientation is favorable in which the straight line running through the center of gravity and the pivot axis of the inertia mass 12 forms an angle of about 45° with the vertical. The firing mechanism can then be installed unchanged turned through 90° as well.

As indicated in FIG. 2 the inertia mass 12 is provided with an adjustment screw 74 for adjusting its readiness position precisely, i.e. in particular the angle β (FIG. 4).

I claim:

1. In a safety belt restraining system having a tightening means comprising a pyrotechnical gas generator, a firing mechanism comprising:
   a housing;
   a pivotally mounted vehicle-sensitive inertia mass pivotable after overcoming an inhibition threshold;
   a spring-loaded pivotally mounted strike piece;
   an impact fuse for the pyrotechnical gas generator;
   a firing pin having a first free end lying opposite said impact fuse of the pyrotechnical gas generator and having another end lying opposite the strike piece;
   a trigger mechanism movable between a readiness state and an actuating state, said trigger mechanism when in its readiness state holding said strike piece at a distance from said opposite other end of said firing pin, and said vehicle-sensitive inertia mass cooperating with said trigger mechanism such that on vehicle-sensitive pivoting of said inertia mass said trigger mechanism releases said strike piece which then under the action of said spring load is driven to the oppositely located other end of said firing pin, strikes the latter, and said firing pin effects firing of the impact fuse and of the gas generator;
   said trigger mechanism including a roller blocking mechanism comprising:
   a retaining roller mounted at the end of said strike piece remote from said firing pin;
   a release roller mounted on said inertia mass;
   a support roller mounted fixed with respect to said housing; and
   a loose blocking roller held in the readiness state between said retaining roller, said release roller and said support roller,
   and in the readiness state said blocking roller assumes between said retaining roller and said support roller an over-deadcenter position in which it is held by said release roller which in turn is disposed in an over-deadcenter position in which it is supported by a housing-fixed abutment.

2. Firing mechanism according to claim 1, wherein said trigger mechanism is housed in a flat housing, said housing being closed by a narrow bottom plate, and said firing pin passing through said narrow bottom plate.

3. Firing mechanism according to claim 1, wherein said housing-fixed abutment is formed by said support roller on which said inertia mass bears.

4. Firing mechanism according to claim 1, wherein said inertia mass is formed as a generally U-shaped stirrup member having a first leg and a second leg, said inertia mass being pivotally mounted at the end of its one leg, and said release roller being arranged at the end of the other leg of said inertia mass.

5. Firing mechanism according to claim 4, wherein said stirrup member comprises a projection at the end of its pivotally mounted leg, said projection being directed towards said blocking roller and ending at a slight distance from the latter.

6. Firing mechanism according to claim 4, wherein said support roller is arranged between the legs of the stirrup member, said stirrup member comprising a web connecting its legs, said web having an inner side, and said stirrup member bearing with the inner side of its web on the periphery of the support roller.

7. A firing mechanism for a gas generator of a tightening device in a safety belt restraining system, said mechanism comprising:
   a housing;
   an impact fuse for igniting the gas generator;
   a firing pin for igniting said impact fuse upon impact of said firing pin against said impact fuse, said firing pin being positioned in a bore in the housing, said firing pin having a first end positioned opposite said impact fuse;
   a movably mounted strike piece for striking a second end of said firing pin, said second end of said firing pin being positioned opposite said strike piece;
   spring means for providing a force to urge said strike piece from a ready position toward said second end of said firing pin;
   a trigger mechanism for maintaining said strike piece in the ready position and for permitting movement of said strike piece toward said second end of said firing pin, said trigger mechanism including a part, said part in one location blocking movement of said strike piece, said part being movable to a second location, said part in the second location enabling said spring means to move said strike piece toward said second end of said firing pin; and
   a movable mass, said movable mass being movable in response to an inertial force, said movable mass being in a first position for values of the inertial force below a predetermined value, said movable mass being movable from the first position for values of the inertial force above the predetermined value, said movable mass holding said part in the first location when said movable mass is in the first position, said movable mass enabling said part to move to the second location upon movement of said movable mass from the first position.

8. A firing mechanism as set forth in claim 7, said trigger mechanism including a roller mounted on a second end of said strike piece, said part being engaged with said roller mounted on said second end of said strike piece when said part is in the first location for blocking movement of said strike piece.

9. A firing mechanism as set forth in claim 7, said trigger mechanism including a roller mounted on an end of said movable mass, said part being engaged with said roller mounted on said end of said movable mass when said movable mass is in the first position, said roller mounted on said movable mass retaining said part in the first location.

10. A firing mechanism as set forth in claim 7 said trigger mechanism including a first roller mounted on a second end of said strike piece, a second roller mounted on an end of said movable mass, and a third roller mounted on said housing, said part engaging said first, second and third rollers when said part is in the first location, said first, second and third rollers providing a means for maintaining a center axis of said part at a location between said second roller and a line which intersects center axes of said first and third rollers to maintain said part in the first location.

11. In a safety belt restraining system having a tightening means comprising a pyrotechnical gas generator, a firing mechanism comprising:
    a housing;
    a pivotally mounted vehicle-sensitive inertia mass pivotable after overcoming an inhibition threshold;
    a spring-loaded pivotally mounted strike piece;
    an impact fuse for the pyrotechnical gas generator;
    a firing pin having a first free end lying opposite said impact fuse of the gas generator and having another end lying opposite said strike piece;
    a trigger mechanism movable between a readiness state and an actuating state, said trigger mechanism when in its readiness state holding said strike piece at a distance from said opposite other end of said firing pin, and said vehicle-sensitive inertia mass cooperating with said trigger mechanism such that on vehicle-sensitive pivoting of said inertia mass said trigger mechanism releases said strike piece which then under the action of said spring load is driven to said oppositely located other end of said firing pin, strikes the latter, and said firing pin effects firing of said impact fuse and of the gas generator; and
    a securing means for arresting said inertia mass in its readiness position, said securing means being responsive to actuation of the safety belt restraining system for cancelling the arresting of the inertia mass.

12. A firing mechanism for a gas generator of a tightening device in a safety belt restraining system, said mechanism comprising:
    a flat housing having an interior cavity;
    a narrow plate for closing said interior cavity of said housing;
    an impact fuse for igniting the gas generator;
    a firing pin for igniting said impact fuse, said firing pin having a first end positioned opposite said impact fuse and having a second end projecting into the interior cavity of said housing; said firing pin being received in and being movable through a bore of said narrow plate;
    a pivotally mounted strike piece for striking said second end of said firing pin, said second end of said firing pin being positioned opposite said strike piece;
    spring means for biasing said strike piece toward said second end of said firing pin;
    a trigger mechanism for holding and releasing said strike piece, said trigger mechanism being movable between a readiness state and an actuated state, said trigger mechanism in the readiness state holding said strike piece at a distance from said second end of said firing pin, said trigger mechanism in the actuated state enabling said spring means to move said strike piece toward said second end of said firing pin; and
    a pivotally mounted inertia mass pivotable in response to an inertial force after overcoming an inhibition threshold, said inertia mass in a first position holding said trigger mechanism in the readiness state, said inertia mass in a second position enabling said trigger mechanism to move to the actuated state.

* * * * *